United States Patent [19]

Matsuno et al.

[11] Patent Number: 4,765,455
[45] Date of Patent: Aug. 23, 1988

[54] CHAIN CONVEYOR REDUCING LONGITUDINAL CONTACT PRESSURE BETWEEN CONVEYED ARTICLES

[75] Inventors: Kazumasa Matsuno, Kawanishi; Kenji Kose, Nagoya, both of Japan

[73] Assignee: Tsubakimoto Chain Co., Osaka, Japan

[21] Appl. No.: 906,071

[22] Filed: Sep. 11, 1986

[30] Foreign Application Priority Data

Oct. 3, 1985 [JP] Japan ............... 60-150859[U]

[51] Int. Cl.⁴ .............................................. B65G 17/00
[52] U.S. Cl. ..................................... 198/779; 198/851
[58] Field of Search .............................. 198/779, 851

[56] References Cited

U.S. PATENT DOCUMENTS

| 561,582 | 6/1896 | Guilier, Jr. ............... | 198/851 X |
| 2,954,113 | 9/1960 | Hibbard et al. ............ | 198/851 X |
| 2,955,700 | 10/1960 | Badger .................... | 198/851 |
| 3,119,276 | 1/1964 | Pearson .................... | 198/851 |
| 3,373,860 | 3/1968 | Lindgren et al. ........... | 198/779 X |
| 3,381,798 | 5/1968 | Kornylak ................... | 198/779 |
| 3,701,413 | 10/1972 | Leahy et al. ............... | 198/779 |
| 3,894,627 | 7/1975 | Jabbusch et al. ........... | 198/779 X |
| 4,262,794 | 4/1981 | Bourgeois ................. | 198/779 X |

FOREIGN PATENT DOCUMENTS

| 55-89110 | 7/1980 | Japan. | |
| 55-89111 | 7/1980 | Japan. | |
| 0659468 | 4/1979 | U.S.S.R. | 198/851 |
| 1077827 | 3/1984 | U.S.S.R. | 198/851 |

Primary Examiner—Kenneth J. Dorner
Assistant Examiner—José V. Chen
Attorney, Agent, or Firm—Howson and Howson

[57] ABSTRACT

In a conveyer for articles comprising two chains running in parallel to each other, articles are supported by rollers rotatably supported on rods having pins at their ends which pivotally connect the adjacent links of the chains. The conveyor structure is light in weight, and damage to rollers is avoided because rollers on adjacent rods cannot contact each other as the return run travels over convex supporting plates. On each chain, link plates of either the inner or outer links, on the side of the chain adjacent to the rollers, are formed with outwardly projecting flat surfaces which are substantially at the same height as the article carrying peripheral surfaces of the rollers. These outwardly projecting flat surfaces allow convenient lateral transfer of articles from one conveyor to another by means of transfer guides.

1 Claim, 3 Drawing Sheets

CHAIN CONVEYOR REDUCING LONGITUDINAL CONTACT PRESSURE BETWEEN CONVEYED ARTICLES

BRIEF SUMMARY OF THE INVENTION

This invention relates to chain conveyors and more specifically to an improved chain conveyor in which longitudinal mutual contact pressure between conveyed articles is reduced.

In a chain conveyor, contact between conveyed articles results from friction between the conveyed articles and the conveyor. When forward movement of an article on the conveyor is checked while the conveyor is moving, friction between the succeeding articles and the conveyor causes the conveyed articles to come into, and remain in, longitudinal contact with one another. Damage to the conveyed articles can occur as a result of contact between them, and also as a result of rubbing friction between the conveyor and the stopped articles.

This problem has been addressed in the past by providing rollers on the conveyor to reduce the friction between the conveyor and the conveyed articles. However, as will be explained more fully in the detailed description below, prior attempts to solve the friction problem by the use of rollers have resulted either in excessive chain tension, or in the possibility of damage to the rollers.

The invention avoids the problems of excessive tension and roller wear in the following manner. The conveyor comprises a pair of spaced parallel chains, each comprising alternating pairs of inner and outer link plates. That is, each chain comprises a repeating pattern of link plates in which two inner link plates situated side by side, and constituting one link of the chain, are embraced on their respective outside surfaces by two outer link plates, which constitute the next link in the chain. The outer link plates and the inner link plates of the two conveyor chains are coupled together for articulating motion by stay pins formed on rods which extend from one chain to the other across the space between the chains. Each rod extends through a plurality of rollers for bearing conveyed articles, and supports these rollers rotatably on the same axes on which the chain links articulate.

On each chain, the upper portions of either the outer or inner link plates positioned on the side of the chain nearest the rollers, are preferably bent toward the outside of the conveyor so that they form flat portions whose top surfaces are at substantially the same height as the outer peripheral surfaces of the rollers. These flat portions project toward the outside beyond the outer ends of the stay pins.

All the rollers for bearing conveyed articles are supported rotatably on the rods which are inserted through the rollers. The stay pins formed at the opposite ends of the rods serve as connecting pins for the conveyor chain links, and the chains move with the conveyed articles borne on the rollers. The rollers on adjacent rods cannot contact one another longitudinally even where the chains are bent around sprockets or guides. Moreover, the flat portions formed on the links of the chains, which have substantially the same height as the outer peripheral surfaces of the rollers, and project toward the outside beyond the stay pins, enable conveyed articles to be transferred smoothly between conveyors when a number of conveyors according to the invention are employed. The chain links are readily disjoined, and the rollers can be removed by pulling the stay pins out of the chains, making maintenance of the conveyor easy to accomplish.

The principal object of the invention is to reduce longitudinal contact pressure between conveyed articles, and to prevent damage to the articles, while avoiding excessive chain tension and avoiding damage to the conveyor rollers. Another object of the invention is to provide simple and convenient means to facilitate transfer of articles from one conveyor to another. Still another object of the invention is to simplify maintenance of the conveyor. Further objects and advantages of the invention will be apparent from the following detailed description, when read in conjunction with the drawings.

DETAILED DESCRIPTION

Figure 3:
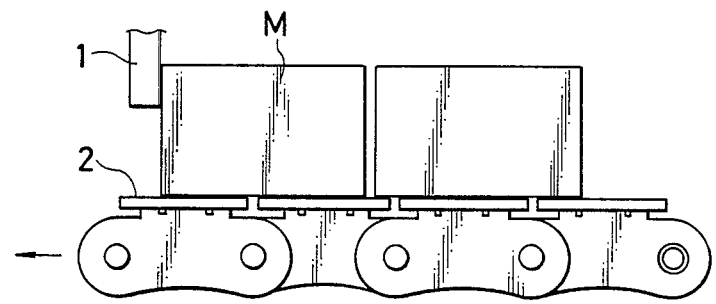
FIG. 3 is a side elevation showing a portion of a flat top chain conveyor.

In the conventional flat top chain conveyor of FIG. 3, when conveyed articles M are stopped in the course of operation by a stop 1, they are forced to contact one another longitudinally by reason of the friction between top plates 2 and the conveyed articles. In some cases, damage can occur by reason of the pressure exerted by one article against another, or by reason of movement of the conveyor relative to the conveyed articles.

Figure 4:
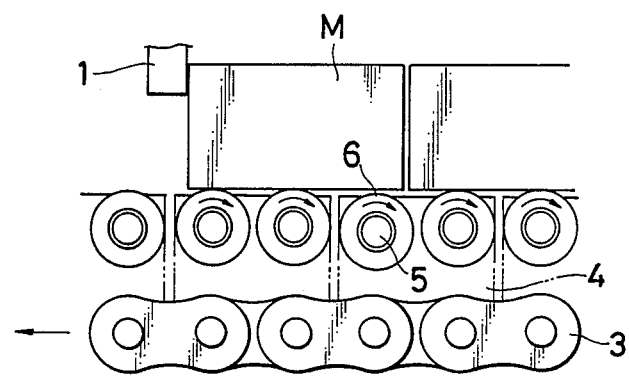
FIG. 4 is a side elevation showing a portion of a conventional chain conveyor having rollers.

To solve this problem, a conveyor, as shown in FIG. 4, was proposed in Japanese Patent Publications Nos. 89110/1980 and 89111/1980. In the conveyor of FIG. 4, stay pins 5 are supported by bearings 4 fitted to the links of two parallel conveyor chains one of which is seen at 3. Conveyed articles M are placed on rollers 6 supported by, and rotatable on, the axes of the stay pins. When the conveyed articles M are stopped by stop 1, rollers 6 rotate, and therefore only a small forward force, corresponding to the rotational friction of rollers 6, acts on conveyed articles M. Consequently, the force with which any one conveyed article is pressed against another is weak, and the incidence of damage to the articles is sharply reduced.

Figure 5:
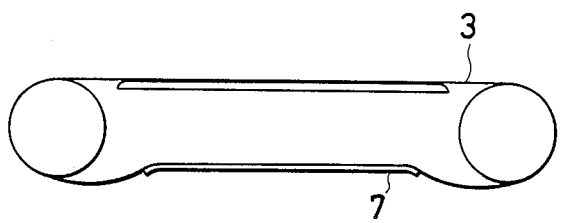
FIGS. 5(a), 5(b) and 5(c) are schematic views showing three conventional alternative methods of supporting the return run of a conveyor of the type shown in FIG. 4.
Figure 5:
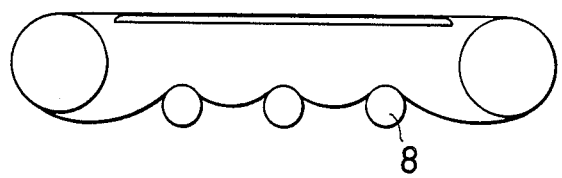
Figure 5:
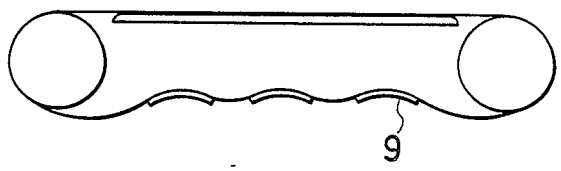
Figure 6:
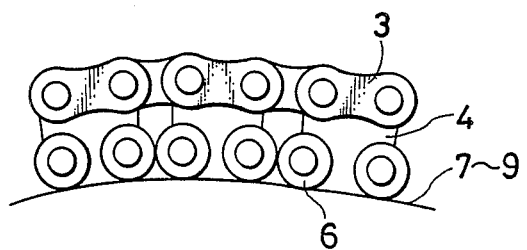
FIG. 6 is a side elevation of a portion of a return run of the conveyor of FIG. 4, illustrating how roller damage can occur.

If chain 3 is long, however, the tension in the return run of chain 3 becomes excessive due to the weight of bearings 4, stay pins 5, rollers 6, etc. Therefore, it is necessary to support the return run of the conveyor by a support member such as a guide board 7, a plurality of idler rollers 8 or curved guide boards 9, as shown in FIGS. 5(a), 5(b) and 5(c) respectively. In each case, parts of the chains 3 in the return run are curved upward by the support member. Consequently, as shown in FIG. 6, the rollers 6 on adjacent bearings 4 are pressed against one another. This results in a significant possibility of damage to the rollers since they are generally made of synthetic polymers, which are subject to damage by wear or impact.

Figure 1:
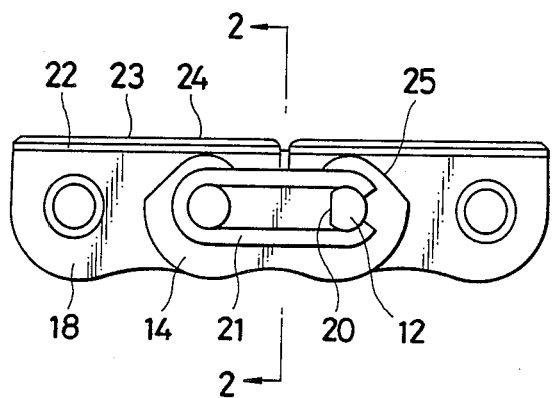
FIG. 1 is a side elevation of a portion of a conveyor in accordance with the invention.
Figure 2:
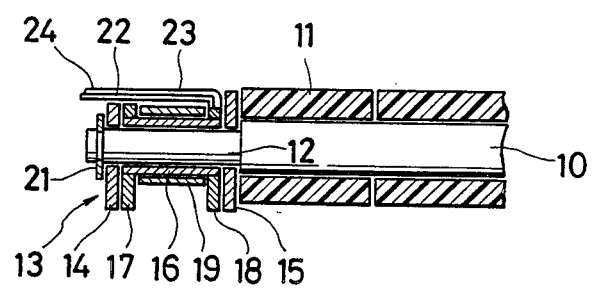
FIG. 2 is a fragmentary sectional view taken on plane 2—2 of FIG. 1, showing one of the two chains of the conveyor, and also showing one of the rollers and part of another.

In the invention, as shown in FIGS. 1 and 2, a plurality of rollers 11 for bearing conveyed articles, which are made of synthetic polymers or the like, are supported rotatably by a rod 10 inserted therethrough. Small diameter pins 12 are formed on opposite ends of rod 10 and serve also as connecting pins for members of two conveyor chains, one of which is shown at 13. At each joint of a chain 13, two inner link plates 17 and 18 are fixed to a bushing 16. The inner link plates are opposed to each other and embraced by outer link plates 14 and 15 which are also opposed to each other. A roller 19 is rotatable on bushing 16.

One of the small diameter pins 12 on each rod has a flat surface 20 and the rods are alternated so that for any given pair of rods, the flattened pin on one rod is on one side of the conveyor, while the flattened pin of the next adjacent rod is on the opposite side of the conveyor. Each of the outer link plates 14 and 15, has a round hole through which the small diameter in 12 having a round cross-section fits closely, and a D-shaped hole having a flattened chord and conforming with the cross-section of the flattened pins. The D-shaped holes, in cooperation with the flattened pins, serve to prevent rotation of rods 10. On the outside of outer link plate 14, an elongated snap ring 21 engages both of the small diameter pins 12 extending through plate 14 so as to prevent the chains from disengaging the pins.

The top edge of the outer link plate 15 near to roller 11 is made to be slightly lower than the article-bearing surface of roller 11, while the top edges of outer link plate 14 and the outside-positioned inner link plate 17 are both still lower than the top edge of the outer link plate 15. The upper portion of the inside-positioned inner link plate 18 is bent toward the outside of the conveyor so that a flat portion 22 is formed. The top surface 23 of flat portion 22 is positioned at substantially the same height as the outer peripheral surface of the roller 11. In addition, the outer end of the flat portion 22 projects toward the outside of the conveyor slightly beyond the outer end of stay pin 10, while a chamfered edge 24 is formed on the periphery of top surface 23. Flat portion 22 enables conveyed articles to be transferred smoothly from one conveyor to another when a number of conveyors in accordance with the invention are employed. The outside-positioned outer link plate 14 has circular arc surfaces 25 in its upper portion so that it does not contact the lower surface of flat portion 22 when the chain is bent.

As an alternative to flat portion 22, a similar outwardly extending flat portion may be provided in the upper part of the outer link plate 15. In this case, the top surfaces of the inner link plates are made sufficiently low to clear the underside of the outwardly extending flat portion of plate 15, and are formed with circular arc surfaces similar to circular arc surface 25 so that they do not contact the outwardly extending flat portion of plate 15 when the chain is bent.

In the above-described construction, chain 13 is disjoinable and when rollers 11 are worn, they can be removed and replaced by removing the snap rings 21 and pulling the stay pins at the ends of rod 10 out of the chain links.

Since the device of the invention has the above-described construction in which a plurality of rollers are fitted rotatably on each rod, the rollers supporting conveyed articles can rotate freely to reduce the pressure of contact between the conveyed articles on a conveyor, and also the working lifetime of the rollers can be extended.

The present invention simplifies structure and maintenance, and the outwardly extending flat portions of the links make it possible to transfer articles conveniently from one conveyor to another laterally by means of transfer guides.

We claim:

1. A chain conveyor enabling the reduction of longitudinal contact pressure between conveyed articles, comprising two chains arranged to move together in spaced parallel relationship, elongated rods extending transversely from one chain to the other, and rollers, having cylindrical outer peripheral surfaces, rotatably carried on said rods for bearing conveyed articles, each chain comprising links of a first set having inner link plates alternating with links of a second set having outer link plates, the outer link plates and inner link plates of two conveyor chains being coupled together bendably by stay pins formed on and projecting from opposite end portions of said rods in the direction of elongation of the rods, and the upper portions of the link plates in one of said sets in at least one of said chains, positioned on the side of the chain nearest the rollers, being bent to form flat portions whose top surfaces have substantially the same height as the outer peripheral surfaces of the rollers, said flat portions extending parallel to the direction of elongation of the rods and over the side of the same chain remote from the rollers, and projecting beyond the ends of the stay pins remote from the rods.

* * * * *